United States Patent
Pulizzi et al.

[11] Patent Number: 5,923,103
[45] Date of Patent: Jul. 13, 1999

[54] SWITCHED-OUTPUT CONTROLLER APPARATUS WITH REPEATER FUNCTION AND METHOD FOR CONSTRUCTING SAME

[75] Inventors: Peter S. Pulizzi, Fountain Valley; Marshall D. Rester, deceased, late of Santa Ana, by Bertha E. Rester, legal representative; William Brent McDonough, Huntington Beach, all of Calif.

[73] Assignee: Pulizzi Engineering, Inc., Santa Ana, Calif.

[21] Appl. No.: 08/832,605

[22] Filed: Mar. 31, 1997

[51] Int. Cl.$^6$ ............................................. H02J 3/14
[52] U.S. Cl. ..................... 307/126; 307/29; 307/30; 307/38; 361/166
[58] Field of Search .................. 307/126, 29, 30, 307/140, 38; 364/528.21; 361/166

[56] References Cited

U.S. PATENT DOCUMENTS

| | | | |
|---|---|---|---|
| 4,674,031 | 6/1987 | Siska | 307/38 |
| 4,719,364 | 1/1988 | Pequet et al. | 307/141 |
| 4,769,555 | 9/1988 | Pequet et al. | 307/141 |
| 4,918,562 | 4/1990 | Pulizzi et al. | 361/86 |
| 5,384,490 | 1/1995 | Swartz | 361/66 |
| 5,424,903 | 6/1995 | Schreiber | 361/166 |
| 5,450,334 | 9/1995 | Pulizzi et al. | 364/528.3 |
| 5,517,423 | 5/1996 | Pomatto | 364/492 |

OTHER PUBLICATIONS

"Microchip Data Book", 1994, Microchip Technology Inc., pp. 2–399 through 2–534.

Primary Examiner—Albert W. Paladini
Attorney, Agent, or Firm—Howard R. Lambert

[57] ABSTRACT

An electronic switched-output controller apparatus comprises a plurality of relays for providing a plurality of controlled switched outputs, the relays being selected from the group consisting of power relays, signal switching relays, dry contact closing relays and combinations thereof, each of the relays having a corresponding relay operating coil. A power section is configured for receiving AC line power and for providing internal operating DC voltage and is connected for providing line AC power to any power relays and thereby to corresponding outputs when the corresponding power relay coils are actuated, and for providing DC voltage to any signal switching relays and thereby to corresponding outputs when the corresponding switching signal relay coils are activated. A microcontroller is connected for receiving at least one operating DC voltage and has outputs connected to the relay coils, the microcontroller being programmable so as to activate one or more of the relay coils in accordance with a preestablished protocol for operation of said relays. An RS485 or RS 482 network, having a parallel-connected RS232 network, is connected to the microcontroller for receiving commands from an external source and for relaying the received signals to another switched-output controller apparatus at a remote distance of up to about 4000 feet. A corresponding method of constructing a switched-output controller apparatus and system is provided.

21 Claims, 6 Drawing Sheets

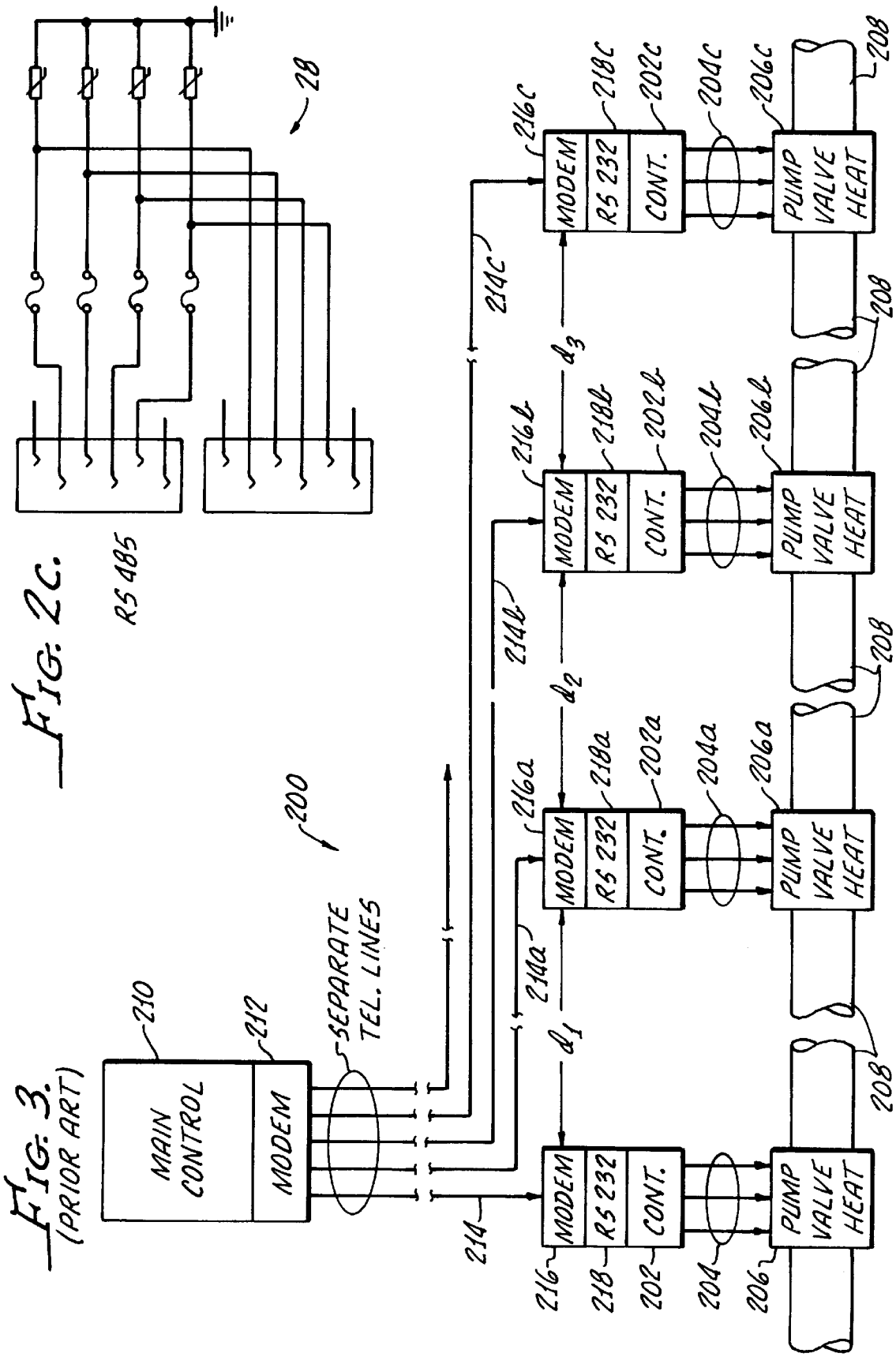

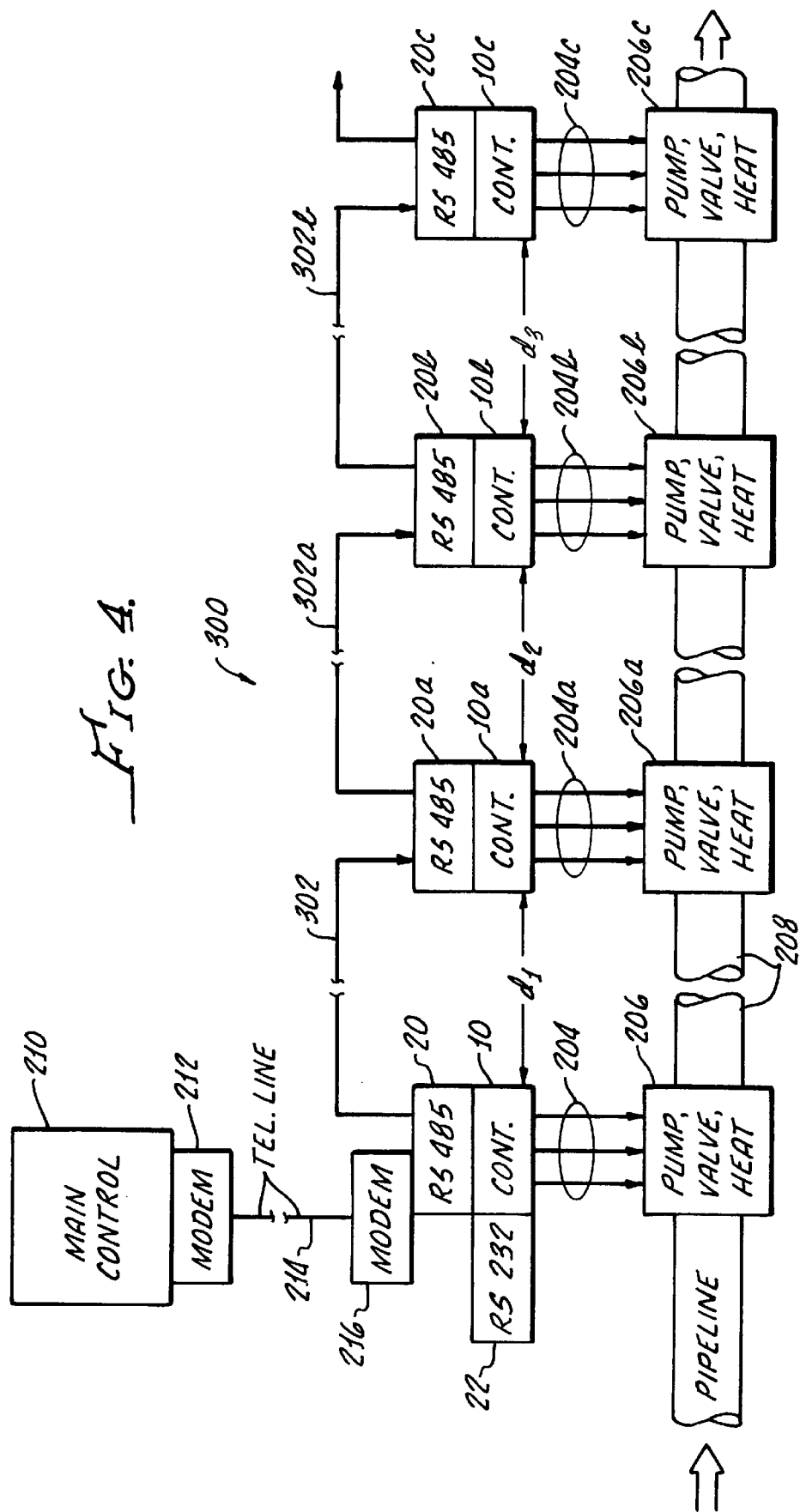

SWITCHED-OUTPUT CONTROLLER APPARATUS WITH REPEATER FUNCTION AND METHOD FOR CONSTRUCTING SAME

BACKGROUND OF THE INVENTION

1. Field of the Invention

The present invention relates generally to the field of electronic apparatus, more particularly to the field of electronic switched-output controller apparatus, and still more particularly to electronic, multiple switched-output, such as switched-power and/or switched-signal, controller apparatus.

2. Background Discussion

Industry often utilizes unattended and/or remotely-located power equipment which is required to be turned on and off in accordance with a preestablished schedule or in response to certain external conditions or stimuli. For example, switched-output power controllers are frequently used to power-up and power-down electrical or electronic equipment, and switched-output control apparatus may be used for providing low-voltage or signal inputs to electronic equipment requiring such inputs for operation.

As an example of switched power needs, when a number of current-drawing electronic apparatus, such as computers, disc drives and printers, are connected to a common building electrical outlet, turning on all the apparatus at the same time can result in a combined high start-up current spike. Such a turn-on power spike may be sufficiently high to trip the circuit breaker associated with the building electrical outlet supplying power to the apparatus, even though the combined steady-state current requirements of all the apparatus are within the current capacity of the circuit. Without time-delay sequencing of the turning on of the equipment, there is needed either a higher current capacity building circuit or more than one building outlet circuit—neither of which may be available or practical to provide in already-constructed offices or buildings.

An appropriately configured, switched-output power controller which provides time-delay turn-ons for the various pieces of connected electronic equipment, so that they do not all turn on at the same instant, can typically remedy this problem of high cumulative start-up current spikes without requiring special or multiple building circuits.

On the other hand, even if the available building circuit capacity is capable of handling high start-up current spikes caused by the simultaneous turning on of a number of pieces of electrical or electronic equipment, it may be required or desired to turn on certain pieces of the equipment before others are turned on. For example, it may be required to turn on a stand-alone disc drive so that it is "up and running" before the associated computer is turned on. Similar delayed turn-off of several pieces of some electronic or electrical equipment may be needed.

Other situations requiring the controlled turning on and off of electrical power or operating signals to electronic or electrical equipment are unattended installations of such equipment or location of such equipment in remote or relatively-inaccessible places. It may, for example, be desired to turn off unattended computers or computer systems whenever they are idle for a predetermined length of time and to turn them back on when they are addressed. It may also be desired to turn off certain unattended or remote electronic equipment, such as computers, fans, or pumps, when monitored ambient conditions, such as temperature, pressure and/or humidity exceed or fall below predetermined limits and to turn the equipment back on when the ambient conditions return to acceptable values.

By way of a still further example, it may be necessary, for equipment protection, to turn off certain pieces of equipment when the available line voltage exceeds or falls below safe equipment operating limits and to turn the equipment back on when the line voltage returns to within predetermined limits.

Controllers having switched power and/or switched signal outputs for the remote controlling of equipment such as motors, pumps, electrical heaters, computers and printers are known. U.S. Pat. No. 5,450,334 (the "'334 patent") to Pulizzi et al., which is incorporated in its entirety herein by reference, discloses, for example, a one time programmable controller apparatus having a number of switched outputs for providing power, operating signals or "dry" contacts to equipment that is connected to the controller apparatus.

The operating sequence of the switched outputs, as disclosed in the '334 patent, is controlled by a one time programmable microprocessor which is programmed, by a burning-in process, by the manufacturer, thereby enabling low-volume, custom switched-output controller apparatus using common components.

Multiple time delay power controllers such as are, for example, disclosed in U.S. Pat. No. 4,769,555 to Pequet, et al., are useful for switched power controlling situations. However, they and other switched-output controllers tend to be uneconomical when only one or a few of the switched-output controllers of a particular configuration are required by customers. The principal reason for this is because such switched-output controllers have heretofore, so far as is known to the present inventors, required to be constructed using customized, "hard wired" circuit cards or boards to which are mounted individual electronic components or circuits.

As another example, U.S. Pat. No. 4,918,562 (the '562 patent) to Pulizzi et al., which is also incorporated herein in its entirety by reference, discloses a more universal—and generally more costly—switched-output controller apparatus which is controlled by a software programmable microprocessor or microcontroller which enables purchasers of the apparatus to program the apparatus to their individual requirements and to reprogram the apparatus as the requirements change.

The power controller apparatus disclosed in the '334, '555 and '562 patents also include conventional RS232 input/output connections which enable remote operation, through modems, from a conventional telephone line.

The switched-output controller apparatus disclosed and claimed in the '334, '555 and '562 patents are extremely useful, especially in the operation of a single group of remotely-controlled electrical apparatus. However, those disclosed switched-output controller apparatus, and other similar, known apparatus, have certain deficiencies when two or more switched-output controller apparatus are needed to control two or more spaced-apart groups of electrical equipment. This is particularly the situation when operation of all the switched-output controller apparatus and their respective groups of electrical equipment is desired or required to be remotely operated in a particular manner or sequence by a single master control and the switched-output controller apparatus are required to be located remotely from one another.

As an example, consider that remote first, second and third switched-output controller apparatus, each having RS232 connections and each having a unique electronic identification number or "address", are used to control respective first, second and third groups of electrical or electronic equipment in accordance with electronic instructions from a single master controller. One possible manner of operating the three switched-output controller apparatus by the master control is for the master control to provide addressed instructions to the first switched-output controller apparatus over a telephone line.

A modem at the master control and another at the first switched-output controller apparatus are connected to provide digitally encoded instructions to the RS232 input of first switched-output controller apparatus. The RS232 output of the first switched-output controller apparatus is connected to the RS232 input connection of the second switched-output controller apparatus and the RS232 output thereof is connected to the RS232 input connection of the third switched-output controller apparatus.

Addressed instructions from the master control are received by the first switched-output controller apparatus and passed on by the RS232 connection to the second switched-output controller apparatus and then, in the same way, onto the third switched-output controller apparatus so that all three switched-output controller apparatus receive the instructions from the master control at virtually the same instant. The switched-output controller apparatus to which the instructions are addressed acts upon the instructions (e.g., to operate the switched outputs) while the instructions are ignored by the other switched-output controller apparatus to which the instructions are not addressed.

A significant limitation of such an arrangement as described above is that the RS232 connections of each of the switched-output controller apparatus are capable of relaying instructions to the next-in-sequence switched-output controller apparatus over a distance of only about two hundred feet. This is not a problem if each switched-output controller apparatus is not separated from the next previous and next following switched-output control apparatus by a distance of over about two hundred feet. It is, however a problem if the distance between any two adjacent switched-output controller apparatus exceeds two hundred feet—as may be the situation when, for example, the controller apparatus are widely spaced apart in large industrial complexes or in installations such as crude oil or gas pipeline installations or widely scattered drilling sites in an oil field.

In such situations where the switched-output controllers are required to be spaced more than two hundred feet apart, it has heretofore, to the knowledge of the present inventors, been the uneconomical practice for the master control to communicate with each of the switched-output controller apparatus by separate telephone lines with each of the controller apparatus having to have its own dedicated modem. Such use of a number of separate telephone lines and modems to communicate with widely spaced apart switched-output controller apparatus requires costly installation and maintenance.

It is, therefore, a principal objective of the present invention to provide switched-output controller apparatus which are able to relay digitally-encoded instructions from one such controller apparatus to another over distances to four thousand feet for the controlling of widely separated groups of electrical or electronic equipment, as is often needed in large industrial complexes, crude oil and gas pipelines, oil fields, highway monitoring systems, university complexes, agricultural applications and similar installations.

SUMMARY OF THE INVENTION

In accordance with the present invention, there is provided a switched-output controller apparatus which comprises a plurality of relays for providing a plurality of controlled switched outputs, the relays being selected from the group consisting of power relays, signal switching relays, dry contact closing relays and combinations thereof, each of the relays having a corresponding relay operating coil. Included is a power section configured for receiving AC line power and for providing internal operating DC voltage and connected for providing line AC power to any power relays and thereby to corresponding outputs when the corresponding power relay coils are actuated, and for providing DC voltage to any signal switching relays and thereby to corresponding outputs when the corresponding switching signal relay coils are activated. A microcontroller is connected for receiving at least one operating DC voltage and having outputs connected to the relay coils, the microcontroller being programmable so as to cause the actuation of one or more of the relay coils in accordance with a preestablished protocol for operation of the relays. Digital signal receiving and relaying means are connected to the microcontroller for receiving commands from an external source and for relaying the received signals to another switched-output controller apparatus at a remote distance of up to about 4000 feet.

Preferably, the digital receiving and relaying means comprise an RS485 or RS422 network that is connected to the microcontroller which is configured for being responsive to external operating signals received by the RS485 or RS422 network for causing the actuation of one or more of the relay coils in accordance with the preestablished operating protocol which requires the external operating signals for actuation of one or more of the relay coils.

A plurality of panel lights is included, the microcontroller being programmed to cause the operation of the panel lights in accordance with the preestablished operating protocol as well as to cause activation of the relay coils. In such case, each of the relays preferably has an associated panel light that is activated by the microcontroller when the relay coil of the associated relay is activated.

There is provided a method for constructing a switched-output controller apparatus which comprises the steps of connecting a power supply for receiving AC line power from an external source and for providing a DC voltage; selecting a plurality of output relays selected as either power relays, signal switching relays, dry contact closing relays or combinations thereof; connecting any of the selected power relays to the power supply for receiving AC line power therefrom and for providing AC line power to corresponding outlets when the power relays are activated.

The method further comprises the steps of connecting any of the selected signal switching relays to the power supply for receiving DC voltage therefrom and for providing DC voltage to corresponding outlets when the signal switching relays are activated; connecting a microcontroller for receiving at least one operating DC voltage and for controlling the actuating of relay coils associated with the selected relays; and connecting an RS485 or RS422 network to the microcontroller for providing instructions thereto and for receiving instructions from the microcontroller. Further included is the step of connecting the RS485 or RS422 network to an external control for providing electronic signals to the network.

A method is also provided for constructing a system of switched-output controller apparatus which comprises the steps of constructing a plurality of switched-output controller apparatus each having an RS485 or RS422 network connected to a microcontroller for providing electrical signals thereto; connecting the output of the RS485 or RS422 network of one of the switched-output controller apparatus to the input of a next one of the plurality of switched-output controller apparatus; and relaying electrical signals from the output of the RS485 or RS422 network of one switched-output controller apparatus to input of the RS485 or RS422 network of the next one of the switched-output controller apparatus.

BRIEF DESCRIPTION OF THE DRAWINGS

The present invention can be more readily understood by a consideration of the following detailed description when taken in conjunction with the accompanying drawings, in which:

FIG. 3 is a pictorial diagram, depicting a prior art manner of communicating with a plurality of switched-output controller apparatus connected to an exemplary crude oil pipeline installation at widely spaced intervals by use of individual telephone lines and modems;

FIG. 4 is a pictorial diagram showing the manner of communicating with a plurality of switched-output controller apparatus of the type depicted in FIGS. 1 and 2 with the switched-output controller apparatus being connected in series with one another through exemplary RS485 connections.

Unless otherwise specifically stated, in the various FIGS. identical elements and features are given the same reference number.

DETAILED DESCRIPTION OF THE INVENTION

Figure 1:
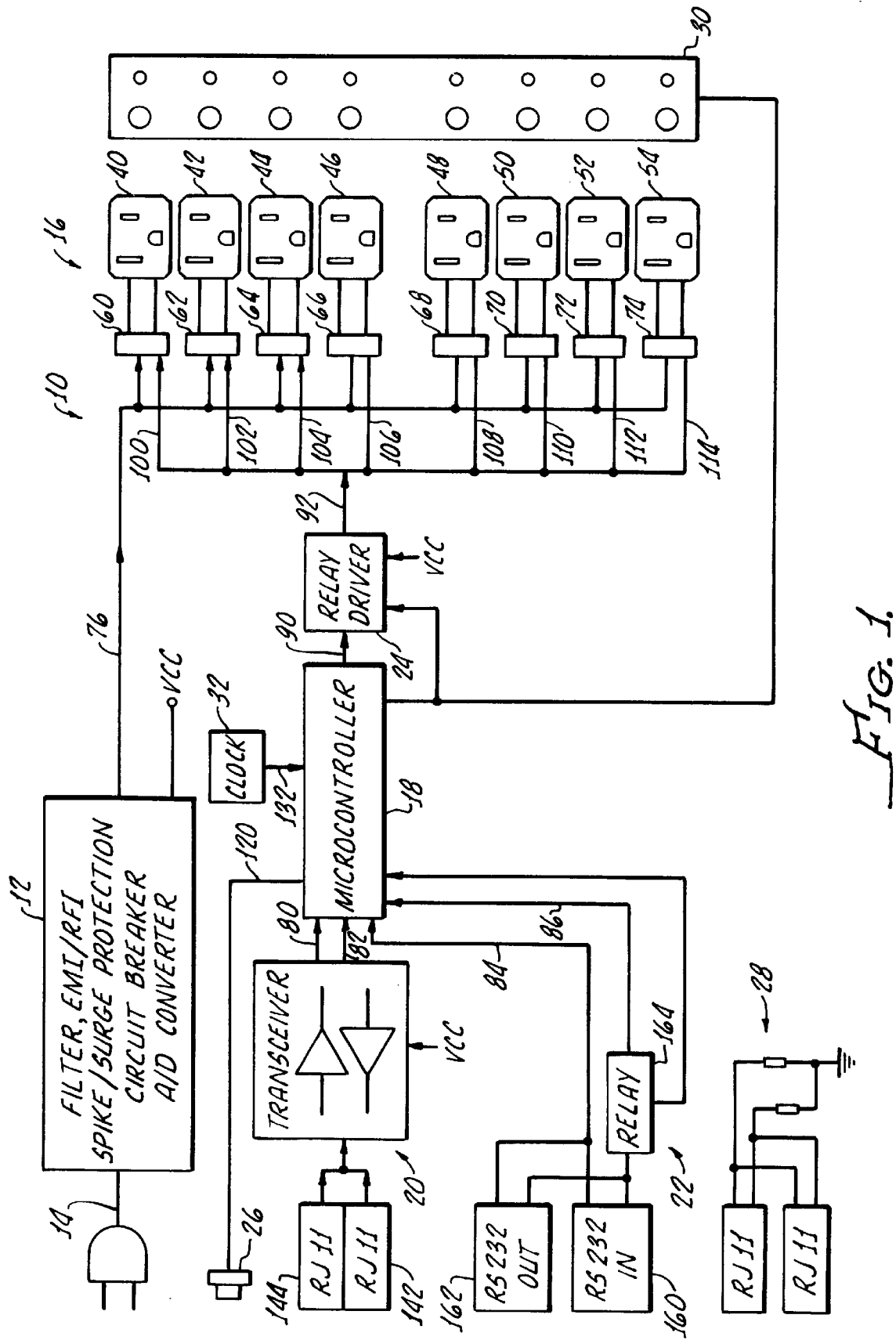
FIG. 1 is a simplified block diagram of the switched-output controller apparatus of the present invention, showing in functional block form the various internal functions of the apparatus, and showing various representative inputs and outputs of the apparatus, including RS232 and RS485 or RS422 inputs and outputs.

There is depicted in FIG. 1, in a simplified functional block diagram form, a switched-output controller apparatus 10 in accordance with a preferred embodiment of the present invention. Shown comprising switched-output controller apparatus 10 is an internal power supply 12 which includes a filter, EMI/RFI spike/surge protection, circuit breaker and A/D converter. Power supply 12 is connected, by a power conduit 14 for receiving AC line voltage and power from an existing power source (not shown), such as a preexisting building outlet, which may provide 115 volts AC or 220 volts AC.

Further comprising switched-output apparatus 10 is a block of switched-outputs 16, a microcontroller 18, an network 20, an RS232 in/out communications circuit 22, relay driver 24, an "on-off" switch 26, a modem protection circuit 28, a front panel indicator/switch 30 and timing means or clock 32.

Network 20 preferably comprises an RS485 circuit, but may alternatively comprise an RS422 circuit. For clarity purposes in describing the present invention, network 20 will generally hereafter be referred to as an RS485 network instead of an RS485 or RS422 network. It is, however, to be understood that an RS422 circuit may be used as an alternative to an RS485 circuit.

By way of example, block of switched-outputs 16 comprises first, second, third, fourth, fifth, sixth, seventh and eighth power outlets or plugs 40, 42, 44, 46, 48, 50, 52 and 54, respectively, which are energized through associated first, second, third, fourth, fifth, sixth, seventh and eighth power relays 60, 62, 64, 66, 68, 70, 72 and 74, respectively.

Line voltage is provided to each of power relays 60, 62, 64, 66, 68, 70, 72 and 74 via a electrical conduit 76 which is shown connected to power supply 12 (line voltage, after being filtered, etc. in portions of the power supply, being fed to the power relays).

It is to be understood, however, that instead of, or in addition to power outlets 40–54 shown, low voltage signal switched outputs or "dry form C" contacts can be provided.

As depicted in FIG. 1, RS485 network 20 is connected by a conduit 80 to microcontroller 18 to provide received commands thereto and by a conduit 82 to receive relayed commands therefrom. RS232 circuit 22 is depicted as being connected by a conduit 84 to microcontroller 18 to provide received commands thereto and by a conduit 86 to receive relayed commands therefrom.

Microcontroller 18 is depicted as being connected to relay driver 24 by a conduit (for example, a multiple conduit) 90, the relay driver being, in turn, connected to operating coils (not shown) of relays 60, 62, 64, 66, 68, 70, 72 and 74, by a conduit 92, which divided into conduits 100, 102, 104, 106, 108, 110, 112 and 114 which connect to respective relays 60, 62, 64, 66, 68, 70, 72 and 74. On/off switch 26 is depicted as being connected to microcontroller 18 by a conduit 120 to turn the microcontroller on and off.

It can be seen from the foregoing description of FIG. 1 that microcontroller 18, which is provided with a unique address, can operate to cause the energizing of any of relays 60, 62, 64, 66, 68, 70, 72 and 74 so as to provide AC power to any corresponding ones of AC outputs 40, 42, 44, 46, 48, 50, 52 and 54 in accordance to instructions received, for example, from RS485 network 20. Alternatively, microcontroller may be programmed to provide a predetermined switching pattern or sequence in response to receiving a "start sequence" instruction, for example, from an external master control, as more particularly described below, via RS485 network 20.

It is, of course to be understood that although relays 60–74 may comprise all AC power relays such as just described above, they may alternatively comprise DC signal voltage relays which are connected to power supply 12 to receive a DC voltage therefrom. As another option, some or all of relays 60–74 but without DC voltage applied thereto, such contact closure relays acting simply as "dry" contact closures (switches), as may be required under certain operating protocols.

As still another alternative (also not shown), relays 60–74 may consist of any desired or needed combination of AC power relays, DC voltage signal relays and simple contact closure relays, according to customer operation protocol requirements. In practice, a single printed circuit card may have locations for a certain number of relays, and any type of relay may be installed in any of the locations, the only requirement being that the appropriate input (e.g., line power over conduit 76) to the relays be provided.

Another advantage of switched-output controller apparatus 10 is that because of "on-board" clock 32, which is connected to microcontroller 18 by a conduit 122, the microcontroller can be programmed so that if no commands are received (for example, from the RS485 network 20 for a preestablished (i.e., a programmed) length of time, apparatus 10 or any of the outputs can be caused to "power down" and "reboot."

Still another advantage of apparatus 10 is that microcontroller 18 is configured having a unique "address," and a number of different, interconnected (as more particularly described below) apparatus 10 can be provided with microcontrollers 18 having different unique addresses. When a microcontroller 18 is sent a command to set address, it takes the next "characters" and stores them in memory. Thereafter (unless the address is changed), all commands to this microcontroller must be prefaced with these characters for the commands to be "received" and acted upon by that particular microcontroller. This enables more than one apparatus 10 to be on line and "listening" for instructions from a master control but each is only responsive to RS485 instructions when the address of its microcontroller 18 is the addressed microcontroller. This addressing capability can also be used for password-type protection.

It will be understood by one skilled in the electronic circuit design art that switched-output controller apparatus 10, as depicted functionally in FIG. 1 and as described above relative to FIG. 1, may be implemented by the use of various electrical or electronic circuits. Nevertheless, it is presently preferred by the present inventors that switched-output controller apparatus 10 be implemented in accordance with the detailed circuit diagram set forth in FIG. 2. It will also be understood that various functions depicted in FIG. 1 are distributed within the design layout of FIG. 2 such that it is difficult to find discrete portions of the circuitry that correspond to each of the functional blocks depicted, for reasons of representing apparatus 10, in FIG. 1.

Figure 2A:
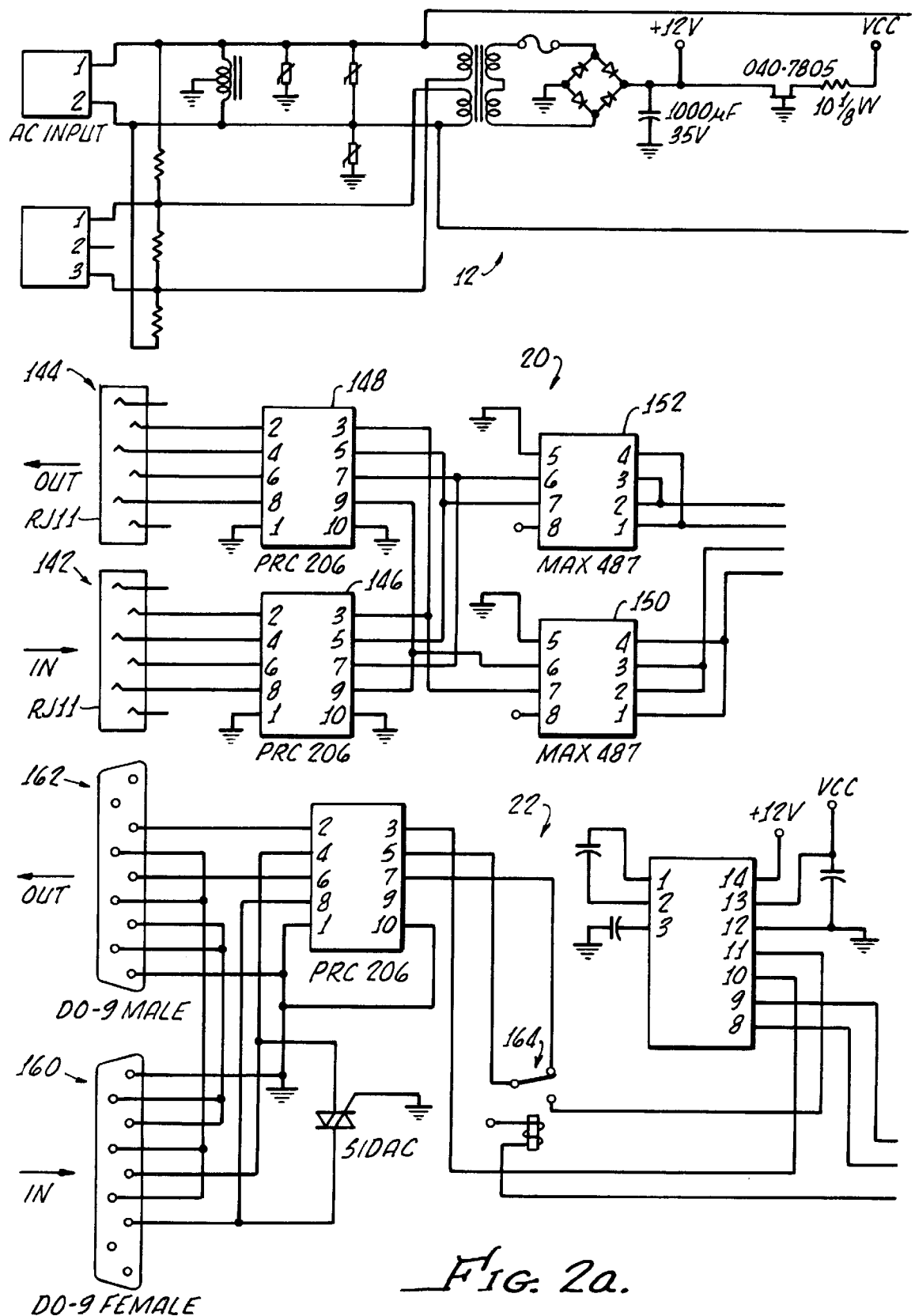
FIG. 2 is an electrical schematic drawing of the switched-output controller apparatus of FIG. 1 showing a preferred manner of implementing the switched-output controller apparatus.
Figure 2B:
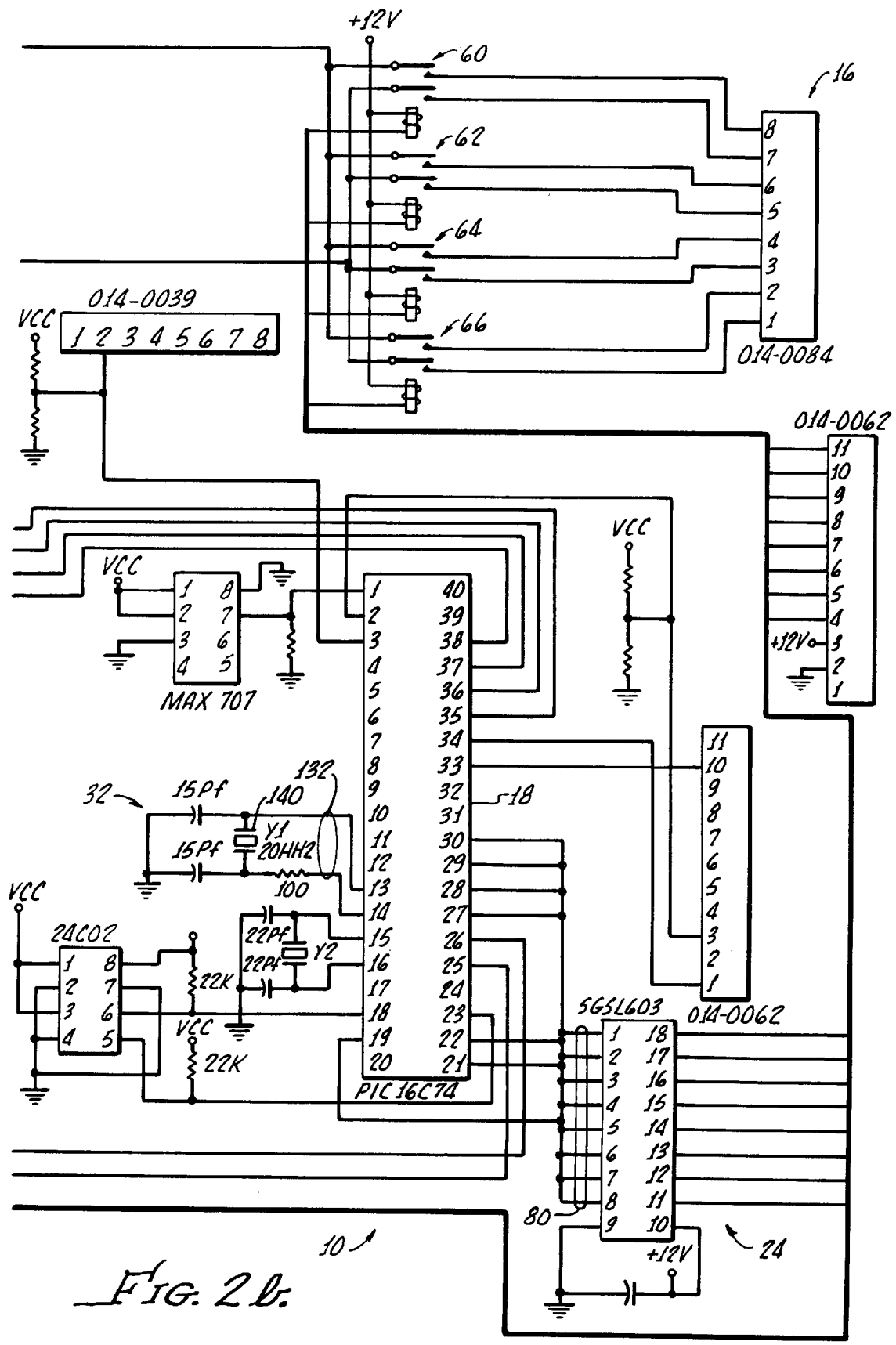

Moreover, it is considered neither feasible nor necessary to describe each electronic component or IC (integrated circuit) and connection shown in the electrical schematic drawing of FIG. 2, especially since all the components, ICs, component values and pin connections are identified in the FIG. 2 schematic. Therefore, only a few major components will be mentioned.

In FIG. 2, microcontroller 18 is shown as comprising a type PIC16C74 40 pin dual inline packaged circuit having pin assignments as shown in FIG. 2. Relay driver 24 is shown as comprising a type SGSL 603 20 pin dual inline circuit, the device input pins 1–8 thereof being connected, respectively, to pins 19, 20, 21, 22, 27, 28, 29 and 30 of microcontroller. Internal clock 32 comprises an 18 MHz crystal oscillator that is connected to respective clock in and clock out pins 13 and 14 of microcontroller.

RS485 network 20 comprises an RJ11 input connector 142 and an RJ11 output connector 144. A transceiver portion of RS485 network comprises first and second type PRC206 circuits 146 and 148, respectively, which are connected between RJ11 connectors 142 and 144 and first and second type MAX487 circuits 150 and 152 which are, in turn, connected to respective microcontroller pins 35, 36 and 37, 38.

RS232 network comprises respective in and out DB-9 connectors 160 and 1162 which are both connected to circuit type PRC206, which is in turn, connected to relay 164, which is, in turn, connected to circuit type MAX231, which is, in its turn, connected to microcontroller pins 25 and 26.
OPERATION There is depicted in FIG. 3 a representative prior art switched-output controller installation 200 which utilizes a number (four being shown) of conventional switched-output controller apparatus. A first switched-output controller apparatus 202 is shown connected by a multiple conduit 204 for powering a first electrical unit 206 which may, for example, include a pump, a valve and a heater (not individually shown) that are used in connection with a crude oil pipeline 208. In a similar manner, a second switched-output controller apparatus 202a is shown connected by a multiple conduit 204a for powering a second electrical unit 206a which may also include a pump, a valve and a heater (not individually shown) that are used in connection with crude oil pipeline 208. A third switched-output controller apparatus 202b is shown connected by a multiple conduit 204b for powering a third electrical unit 206b which also includes a pump, a valve and a heater (not individually shown) that are used in connection with crude oil pipeline 208. In a like manner, a fourth switched-output controller apparatus 202c is shown connected by a multiple conduit 204c for powering a fourth electrical unit 206c which may, for example, include a pump, a valve and a heater (not individually shown) that are used in connection with a crude oil pipeline 208. Additional switched-output controllers operatively connected to additional electrical units would ordinarily be used along pipeline 208.

As depicted in FIG. 3, switched-output controller apparatus 202, 202a, 202b and 202c, along with electrical units 206, 206a, 206b and 206c are spaced apart along pipeline 208 at spaced apart distances $d_1$, $d_2$ and $d_3$ each of which is greater than the 200 foot communication range of an RS232 connection and may be several thousand feet, as dictated by the required spacing of the electrical units.

Shown comprising another part of installation 200 is a central control 210 having associated therewith a modem 212. Control 210 communicates with first switched-output controller apparatus 202 through modem 212 and a telephone line 214 which is connected to a modem 216 and an RS232 connection 218 which is part of controller apparatus 202. In a similar manner, control 210 separately communicates with second switched-output controller apparatus 202a through modem 212 and a telephone line 214a which is connected to a modem 216a and an RS232 connection 218a which is part of controller apparatus 202a. In a similar manner, control 210 separately communicates with third switched-output controller apparatus 202b through modem 212 and a telephone line 214b which is connected to a modem 216b and an RS232 connection 218b which is part of controller apparatus 202b. Likewise, control 210 separately communicates with fourth switched-output controller apparatus 202c through modem 212 and a telephone line 214c which is connected to a modem 216c and an RS232 connection 218c which is part of controller apparatus 202c.

It can thus be seen that a separate modem (216, 26a, 26b and 26c) is required at each switched power controller (202, 202a, 202b and 202c) and that a separate telephone line (214, 214a, 214b and 214c) is required for each one of the series of switched-output controllers (202, 202a, 202b and 202c). This results in a comparatively expensive installation 210.

In contrast, as shown in FIG. 4, a switched-output controller system 300 which is enabled by the present invention and is illustrative of the advantages thereof, comprises respective first, second third and fourth switched-output controller apparatus 10, 10a, 10b and 10c, all of which are preferably identical to one another and to switched-output controller apparatus 10 described above.

First switched-output controller apparatus 10 is connected through a multiple conduit 204 to an electrical unit 206 which is, for descriptive purposes, considered to be the same as above-described electrical unit 206. Second switched-output controller apparatus 10a is connected through a multiple conduit 204a to an electrical unit 206a. Third switched-output controller apparatus 10b is connected through a third multiple conduit 204b to an electrical unit 206b and fourth switched-output controller apparatus 10c is connected through a fourth multiple conduit 204c to an electrical unit 206c.

In the case of installation 300, main control 210 is connected through modem 212 and a telephone line 214 to modem 216 which preferably (as shown) connects to the input of RS232 network 22 which forms part of first switched-output controller apparatus 10 (as described above). The output of RS485 network 20 of first switched-output controller apparatus 10 is connected, over a line 302, to the input of the RS485 network 20a of the next-in-line, second switched-output controller apparatus 10a. The output of RS485 network 20a of second switched-output controller apparatus 10a is connected, over a line 302a, to the input of the RS485 network 20b of the next-in-line, third switched-output controller apparatus 10b, and the output of RS485 network 20b of third switched-output controller apparatus 10b is connected, over a line 302b, to the input of the RS485 network 20c of the next-in-line, fourth switched-output controller apparatus 10c (and so on). It is seen that a communication from main control 210 that is transmitted to first switched-output controller apparatus 10 is always passed down the line of controller apparatus by the RS485 networks 20. Although each of the switched-output controller apparatus 10–10c receive the same communication from main control 210, only the particular switched-output controller apparatus having the address of the communication acts on the communication.

It can thus be seen from FIG. 4 that as long as separation distances $d_1$, $d_2$ and $d_3$ are each less than about 4000 feet (in other words, each may be as great as about 4000 feet), as is usually enabled, installation 300 is much simpler and less costly than the corresponding prior art installation 200 depicted, by way of illustration in FIG. 3.

It will, of course, be understood that installation 300 is merely exemplary of the type of installation in which switched-output controller apparatus 10 of the present invention can be used to advantage. It is, of course, not necessary that each of switched-output controller apparatus 10 are connected for powering or operating identical electrical units, such as units 206–206c depicted in FIG. 4.

A corresponding method for constructing a switched-output controller apparatus is obvious from the foregoing description. Such method includes the steps of connecting a power supply for receiving AC line power from an external source and for providing a DC voltage; selecting a plurality of output relays selected as either power relays, signal switching relays, dry contact closing relays or combinations thereof; connecting any of the selected power relays to the power supply for receiving AC line power therefrom and for providing AC line power to corresponding outlets when power relays are activated; and connecting any of the selected signal switching relays to the power supply for receiving DC voltage therefrom and for providing DC voltage to corresponding outlets when signal switching relays are activated.

The method further includes the steps of connecting a microcontroller for receiving at least one operating DC voltage and for controlling the actuating of relay coils associated with the selected relays; and connecting an RS485 network to the microcontroller for providing instructions thereto and for receiving instructions from the microcontroller.

Included is the step of connecting the RS485 network to an external control for providing electronic signals to the RS485 network.

There is also described a method for constructing a system of switched-output controller apparatus 10, which comprises the steps of constructing a plurality of switched-output controller apparatus each having an RS485 network connected to a microcontroller for providing electrical signals thereto; connecting the output of the RS485 network of one of the switched-output controller apparatus to the input of a next one of the plurality of switched-output controller apparatus; and relaying electrical signals from the output of the RS485 network of one switched-output controller apparatus to the input of the RS485 network of the next one of the switched-output controller apparatus.

Figure 5:
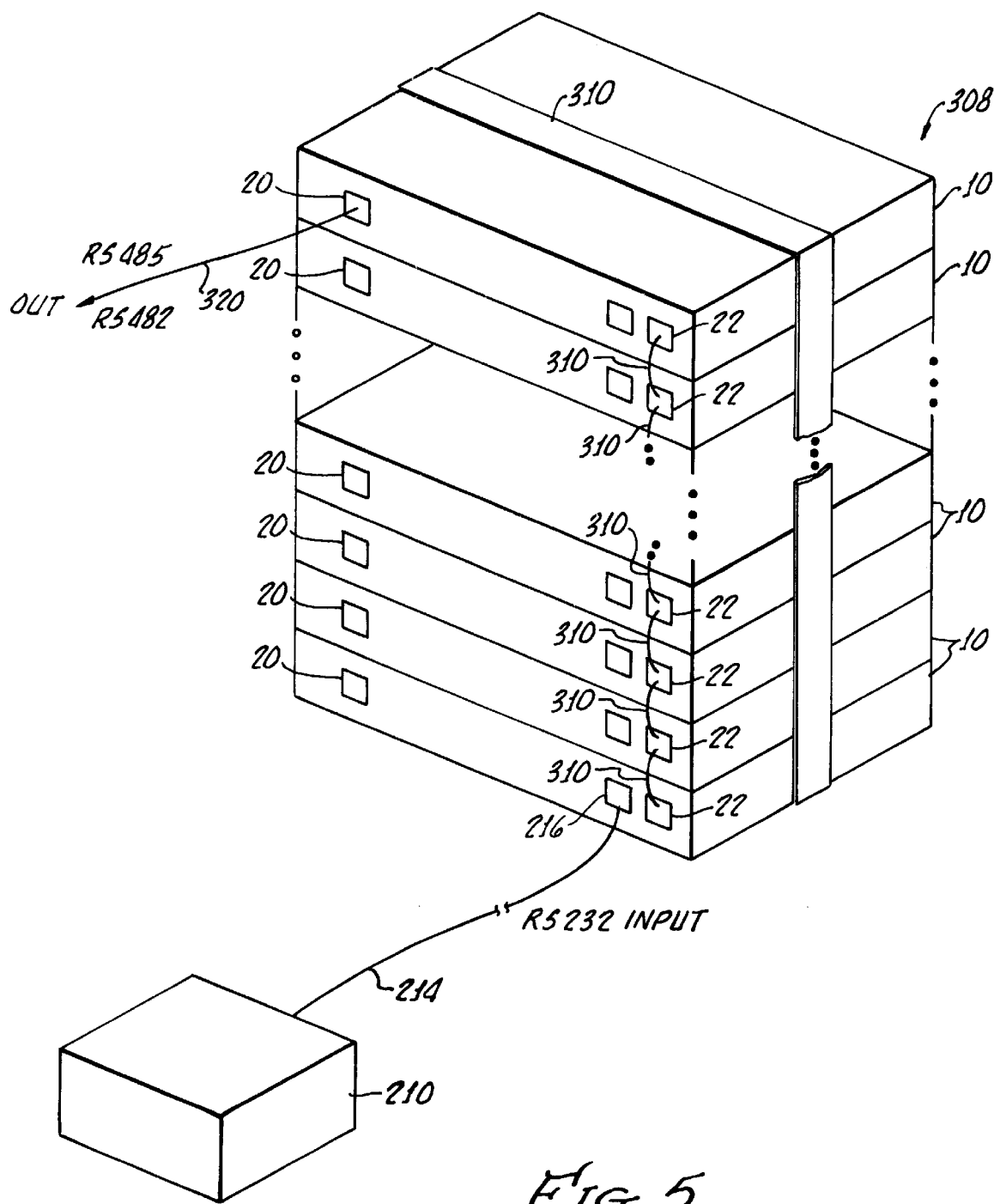
FIG. 5 is a perspective drawing, partially in phantom lines, showing a number of switched-output controller apparatus in accordance with FIG. 1 stacked and banded together to provide an increased number of switched outputs.

As depicted in FIG. 5, it may, for some installations requiring a relatively large number of switched outputs, be desirable to form a stack 308 comprising a number of switched-output apparatus 10, the stack being held together by a surrounding band or strap 310.

In a manner similar to that described above in connection with FIG. 4, a main controller 210 is electrically connected, by a conduit 214, to modem 216 of a bottommost (for illustrative purposes) one of apparatus 10.

The apparatus 10 are electrically interconnected, from an RS232 network 210 of one apparatus to the RS232 network of the next-above apparatus by a conduit 312. The topmost apparatus 10 is, as shown, connected from RS485 (or RS422) network 20 by conduit 302 to a next-in-sequence apparatus 10 or stack 308 of apparatus 10 (not shown).

Although there has been described and illustrated an improved switched-output controller apparatus an associated methods of construction and construction of a switched-output controller system in accordance with the present invention for purposes of illustrating the manner in which the invention may be used to advantage, it is to be appreciated that the invention is not limited thereto. Therefore, any and all variations and modifications that may occur to those skilled in the electronic and power controller arts are to be considered as being within the scope and spirit of the claims as appended hereto.

What is claimed is:

1. A switched-output controller apparatus which comprises:

a. a plurality of relays for providing a plurality of controlled switched-outputs, said relays being selected from the group consisting of power relays, signal switching relays, dry contact closing relays and combinations thereof, each of said relays having a corresponding relay operating coil;

b. a power section configured for receiving AC line power and for providing an internal operating DC voltage and being connected for providing line AC power to any selected power relays and thereby to corresponding outputs when corresponding selected power relay coils are actuated, and being connected for providing DC voltage to any selected signal switching relays and thereby to corresponding outputs when corresponding selected switching signal relay coils are activated;

c. a microcontroller connected for receiving said internal operating DC voltage and having outputs operatively connected to said relay coils, said microcontroller being programmable so as to activate one or more of said relay coils in accordance with a preestablished protocol for operation of said relays; and d. digital signal receiving and relaying means connected to said microcontroller for receiving commands from an external source and for relaying said received signals to another switched-output controller apparatus at a remote distance of up to about 4000 feet.

2. The switched-output controller apparatus as claimed in claim 1, including an RS232 network connected in parallel with said RS485 or RS422 network.

3. The switched-output controller apparatus as claimed in claim 1, including a plurality of panel lights, and wherein said microcontroller is programmed to cause the operation of said panel lights in accordance with said preestablished operating protocol as well as to cause activation of said relay coils.

4. The switched-output controller apparatus as claimed in claim 3, wherein each of said relays has an associated panel light that is activated by said microcontroller when the relay coil of the associated relay is activated.

5. The switched-output controller apparatus as claimed in claim 1, wherein said digital receiving and relaying means comprise an RS485 or RS422 network.

6. The switched-output controller apparatus as claimed in claim 5, wherein said RS485 or RS422 network is connected to said microcontroller.

7. The switched-output controller apparatus as claimed in claim 6, wherein said microcontroller is configured for being responsive to external operating signals received by said RS485 or RS422 network for activating one or more of said relay coils in accordance with said preestablished operating protocol which requires said external operating signals for actuation of one or more of said relay coils.

8. A switched-output controller apparatus which comprises:
   a. a plurality of relays for providing a plurality of controlled switched-outputs, said relays being selected from the group consisting of power relays, signal switching relays, dry contact closing relays and combinations thereof, each of said relays having a corresponding relay operating coil;
   b. a power section configured for receiving AC line power and for providing an internal operating DC voltage and being connected for providing line AC power to any selected power relays and thereby to corresponding outputs when the selected power relay coils are actuated, and being connected for providing said DC voltage to any selected signal switching relays and thereby to corresponding outputs when the selected switching signal relay coils are activated;
   c. a microcontroller connected for receiving said said operating DC voltage and having outputs connected to said relay coils, said microcontroller being programmable so as to activate one or more of said relay coils in accordance with a preestablished protocol for operation of said relays; and
   d. an RS485 or RS422 network connected to said microcontroller for receiving commands from an external source and for relaying said received signals to another switched-output controller apparatus at a remote distance of up to about 4000 feet.

9. The switched-output controller apparatus as claimed in claim 8, wherein said RS485 or RS422 network is connected to said microcontroller for providing input signals thereto and for receiving output signals therefrom.

10. The switched-output controller apparatus as claimed in claim 8, wherein said microcontroller is configured for being responsive to external operating signals received by said RS485 or RS422 network for activating one or more of said relay coils in accordance with said preestablished operating protocol which requires said external operating signals for actuation of one or more of said relay coils.

11. The switched-output controller apparatus as claimed in claim 8, including a plurality of panel lights, and wherein said microcontroller is programmed to cause the operation of said panel lights in accordance with said preestablished operating protocol as well as to cause activation of said relay coils.

12. A method for constructing a switched-output controller apparatus having signal repeater capabilities, said method comprising the steps of:
   a. connecting a power supply for receiving AC line power from an external source and for providing an internal DC operating voltage from said AC line power;
   b. providing a plurality of output relays selected as power relays, signal switching relays, dry contact closing relays or combinations thereof, each of said relays being connected to a corresponding switched output;
   c. connecting any of said selected power relays to said power supply for receiving AC line power therefrom and for providing said AC line power to said corresponding outlets when said selected power relays are activated;
   d. connecting any of said selected signal switching relays to said power supply for receiving said internal DC voltage therefrom and for providing said DC voltage to said corresponding outlets when said selected signal switching relays are activated;
   e. connecting a microcontroller for receiving said internal DC operating voltage and for controlling the actuating of relay coils associated with said selected relays; and
   f. connecting an RS485 or RS422 network to said microcontroller for providing electronic instructions thereto and for receiving electronic instructions from the microcontroller for relaying to another similar apparatus located a distance of up to about 4000 feet away.

13. The method as claimed in claim 12, including the step of connecting the RS485 or RS422 network to an external control for providing electronic signals to said RS485 or RS422 network.

14. The method as claimed in claim 12, including the step of connecting an RS232 network in electrical parallel with said RS485 or RS422 network for receiving an electronic signal from an external controller and for providing said received signal to said microcontroller.

15. A method for constructing a system of switched-output controller apparatus each having signal repeater capabilities, said method comprising the steps of:
   a. constructing a plurality of switched-output controller apparatus each having an RS485 or RS422 network connected to a microcontroller for providing electrical signals thereto, each of said RS485 or RS422 networks having a signal input and a signal output;
   b. spacing apart adjacent ones of said switched-output controller apparatus a distance which may be as great as about 4000 feet;
   c. connecting the signal output of the RS485 or RS422 network of one of said switched-output controller apparatus to the signal input of an adjacent one of said plurality of switched-output controller apparatus; and
   d. relaying electrical signals from said output of the RS485 or RS422 network of said one switched-output controller apparatus to said RS485 or RS422 network of said adjacent one of said switched-output controller apparatus.

16. The method as claimed in claim 15, including the step of connecting at least some of said switched-output controller apparatus in series with one another.

17. The method as claimed in claim 15, including the step of connecting an RS232 network in parallel with the RS485 or RS422 network of a first one of said switched-output controller apparatus.

18. The method as claimed in claim 17, including the step of providing a master controller and connecting the RS232 network of said first one of said switched-output controller apparatus for receiving electrical signals from said master controller.

19. A method for constructing a system of switched-output controller apparatus each having signal repeater capabilities, said method comprising the steps of:

a. constructing a plurality of switched-output controller apparatus each having an RS485 or RS422 network connected to a microcontroller for providing electrical signals thereto, each of said RS485 or RS422 networks having a signal input and a signal output;

b. spacing at least adjacent ones of some of said switched-output controller apparatus a distance apart which may be as great as about 4000 feet;

c. connecting at least some of said switched-output controllers in electrical series by connecting the signal output of the RS485 or RS422 network of one of said switched-output controller apparatus to the signal input of a next in series one of said plurality of switched-output controller apparatus; and d. relaying electrical signals from said output of the RS485 or RS422 network of said one switched-output controller apparatus to the RS485 or RS422 network of said another one of said switched-output controller apparatus.

20. The method as claimed in claim 19, including the step of connecting an RS232 network in parallel with the RS485 or RS422 network of a first one of said switched-output controller apparatus.

21. The method as claimed in claim 20, including the step of providing a master controller and connecting the RS232 network of said first one of said switched-output controller apparatus for receiving electrical signals from said master controller.

* * * * *